United States Patent [19]  
Sugiura

[11] Patent Number: 4,847,478  
[45] Date of Patent: Jul. 11, 1989

[54] OPTICAL PICK-UP DEVICE

[75] Inventor: Satoshi Sugiura, Saitama, Japan

[73] Assignee: Pioneer Electronic Corporation, Tokyo, Japan

[21] Appl. No.: 195,972

[22] Filed: May 19, 1988

[30] Foreign Application Priority Data

May 19, 1987 [JP] Japan ............................. 121623

[51] Int. Cl.$^4$ ............................................. G01J 1/20
[52] U.S. Cl. ....................................... 250/201; 369/45
[58] Field of Search ............. 250/201 DF; 369/44-46

[56] References Cited

U.S. PATENT DOCUMENTS 4,625,303 11/1986 Shikama ........................... 369/45
4,742,218 5/1988 Nakamura ......................... 369/45

Primary Examiner—Edward P. Westin
Assistant Examiner—Khaled Shami
Attorney, Agent, or Firm—Sughrue, Mion, Zinn, Macpeak & Seas

[57] ABSTRACT

An optical pick-up device includes a light source for irradiating a recording medium to record and/or reproduce information, an objective lens for condensing beams of the light which are reflected or transmitted by the recording medium, an optical member such as a parallel plane plate or a diffraction grating for imposing a diffraction pattern upon the condensed light, and a photo detector for detecting the presence and amount of the patterned light in each of a plurality of regions. The regions on the photo detector correspond to those created by lines curved in accordance with a comatic aberration of the optical member. In particular, the curved lines correspond to the projection of first and second rectilinear lines through the objective lens and the optical member onto the photo detector. The first rectilinear line is parallel to a track on the recording medium, and the second rectilinear is perpendicular to the track.

9 Claims, 4 Drawing Sheets

FIG. 1
FIG. 2(a)
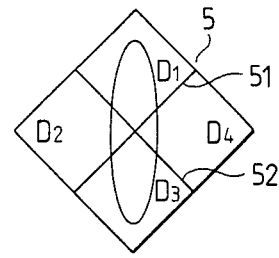
FIG. 2(b)
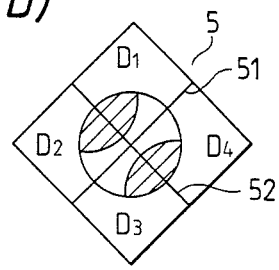
FIG. 2(c)
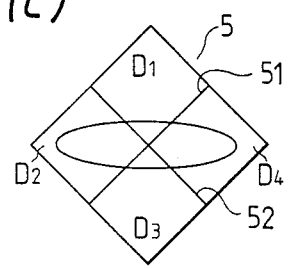
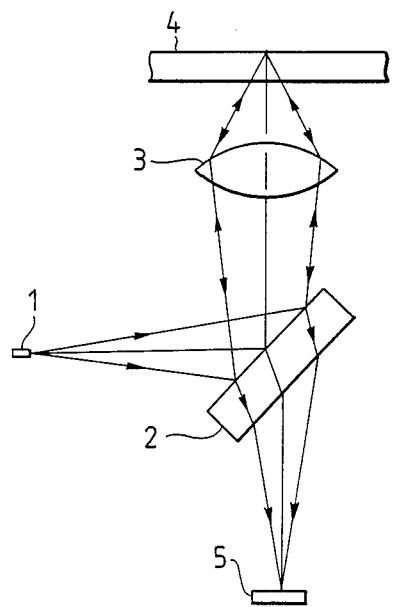
FIG. 3
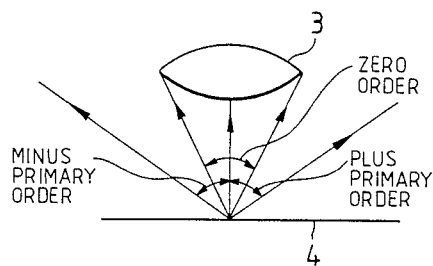
FIG. 4
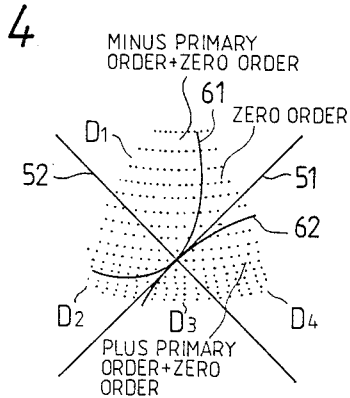

OPTICAL PICK-UP DEVICE

BACKGROUND OF THE INVENTION

The present invention relates to an optical pick-up device suitable for use with an apparatus such as an optical disc player, a compact disc player or an optical video disc player.

FIG. 1 shows a block diagram of a conventional optical pick-up device used in an optical disc system. Rays of divergent light, i.e., laser beams, emerging from a light source 1 such as a semiconductor laser or the like are reflected by a surface of a parallel plane plate 2 and thereafter strike on objective lens 3. The objective lens converges the light incident thereto and irradiates a disc 4 (recording medium) with the converged light.

The rays of divergent light reflected from the disc 4 are condensed by the objective lens 3. The rays then pass through the plane 2 and are converged on a photo detector 5. The plate 2, e.g., an optical member formed with a glass plate, is disposed in the middle of a light path leading to the photo detector 5, and hence astigmatism is created in the light incident upon the photo detector.

The photo detector 5 is, as depicted in FIGS. 2(aa)-2(d) divided into four regions $D_1$ to $D_4$ by first and second rectilinear lines 51 and 52, respectively. The line 51 is drawn parallel to a track on the disc 4 and the line 52 is perpendicular to the line 51. When the light is properly focused on the disc 4, the spot light incident on the photo detector 5 assumes a substantially circular configuration, as illustrated in FIG. 2(b). In contrast, if the disc 4 is spaced farther away from the objective lens 3 or closer thereto than the focal distance, the spot light assumes a substantially vertically or laterally elongated elliptical shape as shown in FIGS. 2(a) and 2(c), respectively. This phenomenon enables focussing and tracking errors to be corrected using a so-called astigmatism method and a so-called push-pull method. In the astigmatism method, a focus error signal is generated based on a difference between a first sum of outputs of the regions $D_1$ and $D_3$ and a second sum of outputs of the regions $D_2$ and $D_4$. In the push-pull method, a tracking error signal can also be produced based on a difference between a third sum of outputs of the regions $D_1$ and $D_2$ and a fourth sum of outputs of the regions $D_3$ and $D_4$.

The above description and methods are valid when based on the assumption that ideally only an astigmatism is created by the plate 2. However, the plate 2 also causes a coma aberration. Consequently, the spot light on the photo detector 5 in a well-focused state really assumes a substantially trapezoidal shape (FIG. 4) rather than a circular shape. FIG. 4 illustrates a situation where the light from the spot light which is incident on the disc 4 (at "an information detecting point") is projected (light beam tracking) on the photo detector 5 through the objective lens 3 and the plate 2 which cause a coma aberration and an astigmatism. The light with which the disc 4 is irradiated is, as illustrated in FIG. 3, diffracted by a track (e.g. a pit thereof) on the disk, while the objective lens 3 serves to condense the 0th-dimensional diffraction light and positive/negative ($\pm$) dimensional diffraction light (created by the plate 2) in FIG. 4.

An exemplary distribution of light on the photo detector 5 in the case of densely arranged tracks (narrow track pitch) is depicted in FIG. 5(a). For sparsely arranged tracks (wide pitch), exemplary distributions are shown in FIGS. 5(b)-5(d), in order of increasing track pitch. The first curved line 61 has ($-$) primary diffraction light and 0th-dimensional light to its left, where the line 61 is concave. The second curved line 62 has ($+$) primary diffraction light and 0th-dimensional light to its right, where the line 62 is concave. In the area of FIG. 4 between the convex portions of the curved lines 61 and 62, there is 0th-dimensional light. It can be observed from the Figures that the distribution curve of the ($\pm$) primary diffraction light is not symmetric with respect to the rectilinear dividing line 51 and overlapped the line 51 as the track pitch increases (FIGS. 5(b)-5(d)). To aid in understanding the diffraction pattern on the photo detectors, FIGS. 6(a)-6(d) respectively show the distribution curve and the dividing lines 51, 52 on the photo detector 5 in FIGS. 5(a)-5(d) projected from the photo detector onto the objective lens 3 through the plate 2.

An example of tracking control using the diffraction pattern of FIGS. 5(b) and 6(b) will now be explained. In FIGS. 5(b) and 6(b), a quantity ($D_1 + D_2$) of the ($-$) primary diffraction light in the regions $D_1$ and $D_2$ is equal to a quantity ($D_{3l} + D_4$) of the ($+$) primary diffraction light in the regions $D_3$ and $D_4$. The quantity of 0th-dimensional diffraction light in the regions $D_1$ and $D_2$ ($D_1 + D_2$) is greater than that in the regions $D_3$ and $D_4$ ($D_3 + D_4$). As a result, even when adequate tracking of the spot light on the disc 4 is performed (that is, when the quantities of rays of $\pm$ primary diffraction light are equal to each other), the 0th-dimensional diffraction light and the ($\pm$) primary diffraction light are synthesized, whereby the generated tracking error signal does not become zero (i.e. $(D_1+D_2)-(D_3+D_4) \neq 0$). Therefore, if the objective lens 3 is tracking-controlled using the tracking error signal, the spot light (information detecting point) will respond to the tracking error signal by moving farther away from the track on which it is intended to be directed. To compensate for this problem, it has been proposed to add an offset amout to a sum of one group of outputs (e.g., $D_{3l}+D_4$). An amount of the offset is, however, dependent on the track pitch and a reflection rate of the disc 4. Hence, it is difficult to effect an adequate offset adjustment if there is some variance in the track pitch and/or reflection rate.

When searching a predetermined track, the spot light (the information detecting point) traverses the track. At this time, an imbalance takes place in the ($\pm$) primary diffraction light: one (e.g. ($+$)) is bright, whereas the other (e.g. ($-$)) is dark. The distribution of ($-$) primary diffraction light in the region $D_1$ is wider than in the region $D_2$. Similarly, the distribution of ($+$) primary diffraction light in the region $D_4$ is wider than in the region $D_3$. Consequently, the ($-$) primary diffraction light becomes dark, whereas the ($+$) primary diffraction light becomes bright. In this case, the sum of outputs of the regions $D_1$ and $D_3$ decreases, while the sum of outputs of the regions $D_2$ and $D_4$ increases. Therefore, the information detecting point traverses the track. It follows that an offset component is produced in the focus error signal.

As explained above, it is difficult to properly determine the tracking error signal and the focus error signal because of the comatic aberration in the conventional devices. To cope with this difficulty, as illustrated in FIG. 7, the conventional device is arranged such that another parallel plane plate 6 (or a cylindrical lens) is disposed facing in an opposite direction to the plate 2 to correct the comatic aberration thereof. This arrangement, however, requires increasing the number of parts, consequently increasing the cost, complexity and size of the device.

SUMMARY OF THE INVENTION

An optical pick-up device according to the present invention includes a light source for emitting light with which a recording medium is irradiated for the purpose of recording and/or reproducing information and an objective lens for condensing beams of light reflected by the recording medium. The device also includes a photo detector for detecting the beams of light passing through the objective lens, and an optical member (such as a parallel plane plate), disposed in the middle of a light path from the lens to the photo detector. In the device, the photo detector is divided into a plurality of region in accordance with curved lines, which are the projections onto the photo detector, through the objective lens and the optical member, of first and second rectilinear lines which are parallel and perpendicular to a track on the recording medium respectively.

The recording medium of the disk is irradiated with the light emitted from the light source. The objective lens serves to condense rays of light which are being transmitted to the recording medium or have been reflected by this medium. The thus condensed light is detected by the photo detector through the optical member. The photo detector is divided by the first and second curved lines as defined above. Consequently, the same function as that in an ideal case where there is no coma aberration is provided even when there is a comatic aberration (in the light incident on the photo detector) caused by the optical member in the inventive device.

BRIEF DESCRIPTION OF THE DRAWINGS

FIG. 1 is a block diagram of a conventional optical pick-up device;

FIGS. 2(a)-2(d) are plan views of the photo detector in the device of FIG. 1;

FIG. 3 is a side view illustrating diffraction from a track of a recording medium;

FIGS. 4 and 5(a)-5(d) are plan views each illustrating the photo detector of FIG. 1;

DETAILED DESCRIPTION OF THE PREFERRED EMBODIMENT

An optical pick-up device according to the present invention can be constructed the same as the conventional device shown in FIG. 1; however, the way in which the light-receiving surface of the photo detector is divided is different.

Figure 5A:
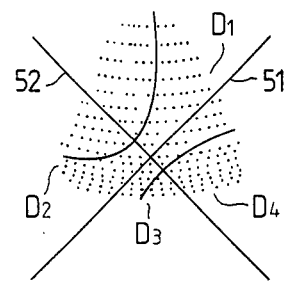
Figure 5B:
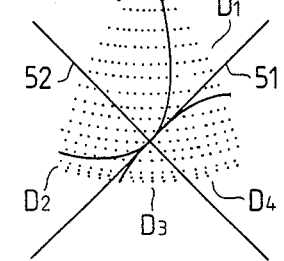
Figure 5C:
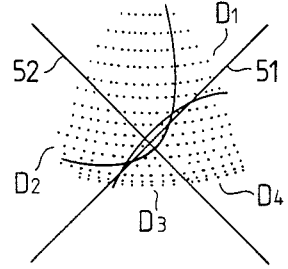
Figure 5D:
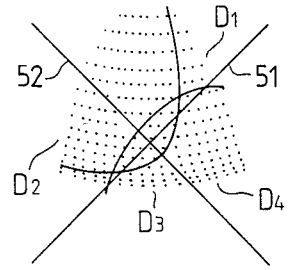
Figure 6A:
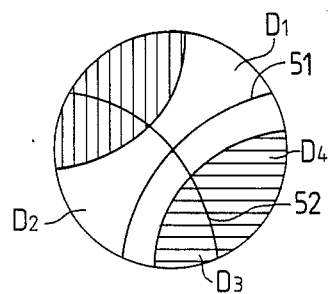
FIGS. 6(a)-6(d) are explanatory views showing a case where the photo detector is projected on an objective lens of the device.
Figure 6B:
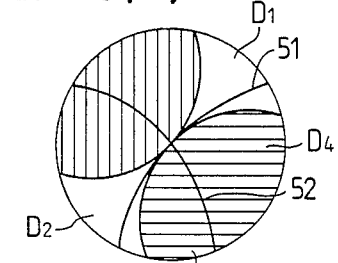
Figure 6C:
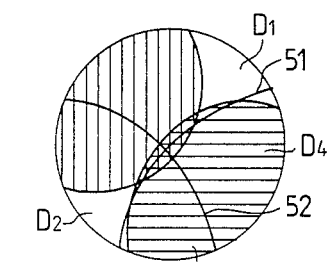
Figure 6D:
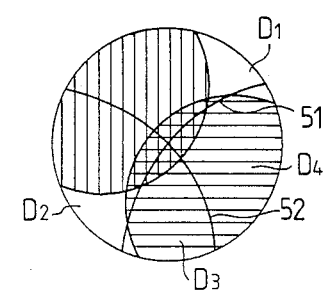
Figure 7:
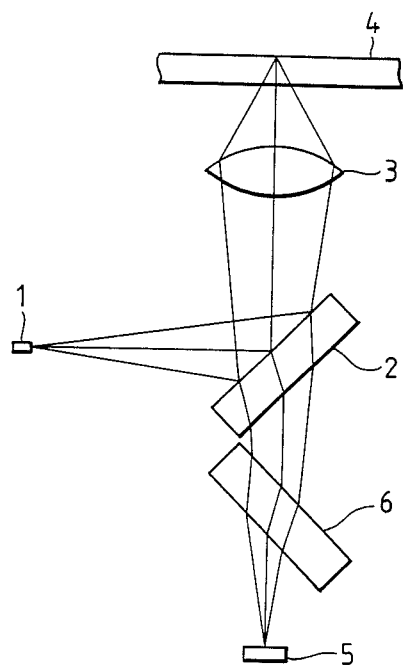
FIG. 7 is a block diagram illustrating a modification to the device of FIG. 1.
Figure 8:
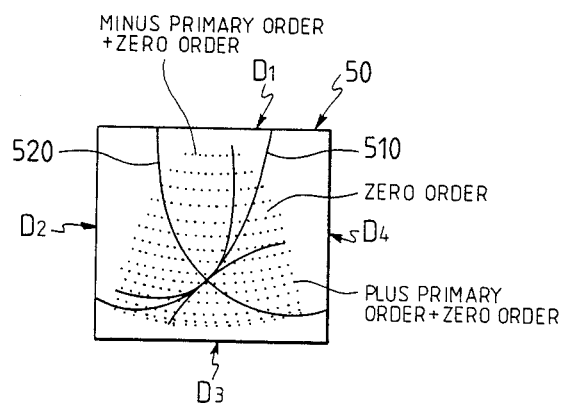
FIGS. 8 and 9(a)-9(d) are plan views each illustrating a photo detector of an optical pick-up device according to the present invention.

FIG. 8 shows a photo detector 50 according to the present invention (in lieu of the photo detector 5 of FIG. 1). The photo detector 50 is divided into four regions $D_1$ through $D_4$ by dividing lines 510 and 520. The dividing line 510 is defined as the curved line which is formed or projected (in light beam tracking) on the photo detector 50 from a rectilinear line parallel to a track on the disc 4 which first passes through the objective lens 3 and the parallel plane plate 2. The dividing line 520 is defined as the curved line formed or projected on the photo detector 50 from a rectilinear line perpendicular to the track on the disc 4. A line that is rectilinear on the disc 4 becomes curved after being projected on the photo detector because the plate 2 causes a coma aberration. The curved lines 510, 520 thus correspond to the rectilinear lines as they would appear on the photo detector due to the comatic aberration.

Figure 9A:
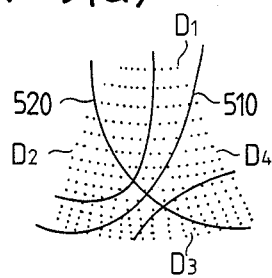
Figure 9B:
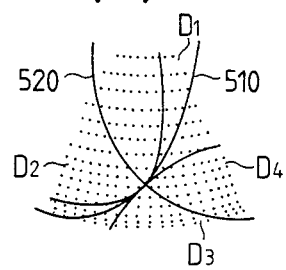
Figure 9C:
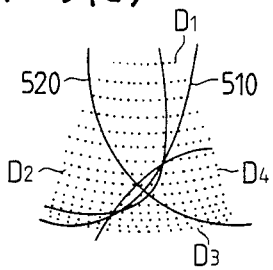
Figure 9D:
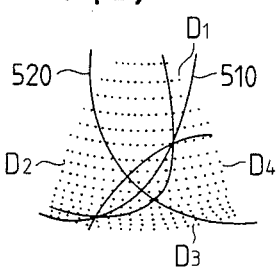
Figure 10A:
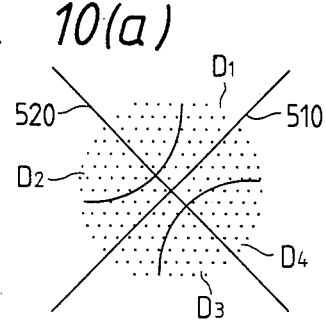
FIGS. 10(a)-10(d) are explanatory views showing a case where the photo detector according to the invention is projected on an objective lens.
Figure 10B:
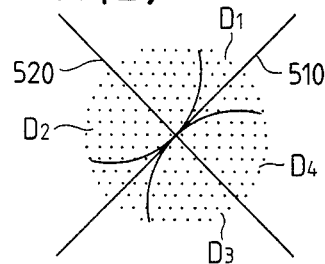
Figure 10C:
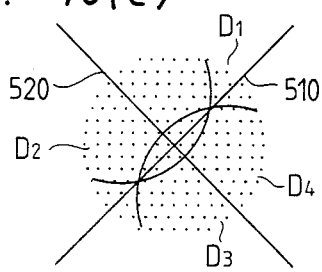
Figure 10D:
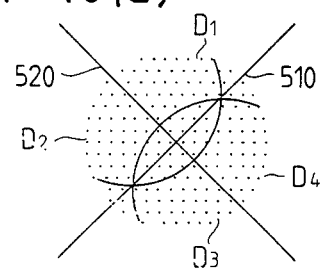

As in FIGS. 5(a)-5(d), FIGS. 9(a)-9(d) respectively show four variations in the distribution curve of ($\pm$) primary diffraction light which correspond to variations of the track pitch of the disc 4. In particular, FIG. 9(a) illustrates a case in which the track pitch is narrow, while FIGS. 9(b) and 9(d) each depict cases where the track pitch is wide.

As in FIGS. 6(a)-6(d), FIGS. 10(a)-10(d) each show a situation where the individual distribution depicted in FIGS. 9(a)-9(d) varies when projecting the curved lines on the objective lens 3 through the plate 2. As is evident from FIGS. 10(a)-10(d), regardless of track pitch, the quantities of ($\pm$) primary diffraction light in each of the regions $D_1$ to $D_4$ equal. In addition, each of the quantities of rays of 0th-dimensional diffraction light are equal. Even when the reflection rate of the disc 4 varies, its resultant influences are equally distributed in the respective regions $D_1$ to $D_4$. Hence, even if there are variations in track pitch and/or reflection rate, no offset is produced in the tracking error signal. In addition, when the spot light traverses the track, the output of the region $D_1$ is equal to that of the region $D_2$, and similarly the outputs of the region $D_3$ and $D_4$ are equal. Consequently, there is no offset in the focus error signal.

With the invention, focus servo and tracking servo based on the astigmatism and push-pull methods can accurately be performed, without using an offset amount and in spite of a comatic aberration.

It should be noted that while the invention has been described with respect to an optical disk system in which the photo detector detects light reflected by the disk, the invention is equally applicable to a transmissive-type optical disc system.

As described above, the optical pick-up device according to the present invention includes: a light source for emitting light with which a recording medium is irradiated to record and reproduce information; an objective lens for condensing beams of light passing through the recording medium; an optical member for diffracting the condensed beams; and a photo detector for detecting the diffracted beams. The photo detector according to the present invention is divided into a plurality of regions in accordance with curved lines, projected on the photo detector through the objective lens and the optical member, into which respective rectilinear lines which are parallel and perpendicular to a track on the recording medium are changed due to comatic aberration of the optical member. With this arrangement, it is possible to completely or virtually completely correct the comatic aberration of the optical member without using any other optical parts and thereby decrease both the size and cost of the device.

I claim:

1. An optical pick-up device comprising:
   means for irradiating a recording medium with light to perform at least one of recording and reproducing information;
   means for condensing the light which is at least one of reflected and transmitted by said recording medium;
   an optical member for receiving the condensed light, and for imposing a detectable pattern on the light, said light from said optical member having a comatic aberration; and
   photosensitive means, divided into a plurality of regions, for receiving the light from said optical member, and for detecting the light in regions, said regions being determined based on lines curved in accordance with the comatic aberration.

2. The optical pick-up device according to claim 1, further comprising means for performing focussing and tracking of the light irradiating the recording medium produced by said irradiating means based on relative amounts of light detected in said regions by said photosensitive means.

3. The optical pick-up device according to claim 1, wherein said photosensitive means comprises a photo detector.

4. The optical pick-up device according to claim 1, wherein said optical member comprises a parallel plane plate.

5. The optical pick-up device according to claim 1, wherein said means for condensing comprises an objective lens.

6. The optical pick-up device according to claim 1, wherein said photosensitive means is divided into four regions.

7. The optical pick-up device according to claim 1, wherein said lines comprise first and second curved lines corresponding to the projection of first and second rectilinear lines through said means for condensing and said optical member onto said photo sensitive means.

8. The optical pick-up device according to claim 7, wherein the recording medium has at least one track formed thereon, and said first and second rectilinear lines are parallel to and perpendicular to the track, respectively.

9. An optical pick-up device comprising:
   means for irradiating a recording medium with light to perform at least one of recording and reproducing information;
   means for condensing the light which is at least one of reflected and transmitted by said recording medium;
   an optical member for receiving the condensed light, and for imposing a detectable pattern on the light, said light from said optical member having a comatic aberration; and
   photosensitive means, divided into a plurality of regions, for receiving the light from said optical member, and for detecting the light in the regions, said regions being determined based on lines curved in accordance with lines parallel and/or vertical relative to a track on said recording medium, said parallel and/or vertical lines being passed through said optical member to be projected on said photosensitive means.

* * * * *